US010878270B1

(12) United States Patent
Cao et al.

(10) Patent No.: US 10,878,270 B1
(45) Date of Patent: Dec. 29, 2020

(54) KEYPOINT-BASED MULTI-LABEL WORD SEGMENTATION AND LOCALIZATION

(71) Applicant: Amazon Technologies, Inc., Seattle, WA (US)

(72) Inventors: Song Cao, Kenmore, WA (US); Hao Wu, Seattle, WA (US); Jonathan Wu, Seattle, WA (US); Meng Wang, Seattle, WA (US); Rahul Bhotika, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 112 days.

(21) Appl. No.: 16/018,510

(22) Filed: Jun. 26, 2018

(51) Int. Cl.
| G06K 9/34 | (2006.01) |
| G06T 7/11 | (2017.01) |
| G06N 3/04 | (2006.01) |
| G06N 5/04 | (2006.01) |
| G06N 20/00 | (2019.01) |

(52) U.S. Cl.
CPC .......... *G06K 9/344* (2013.01); *G06N 3/0454* (2013.01); *G06N 5/046* (2013.01); *G06N 20/00* (2019.01); *G06T 7/11* (2017.01); *G06K 2209/01* (2013.01); *G06T 2210/12* (2013.01)

(58) Field of Classification Search
None
See application file for complete search history.

(56) References Cited

U.S. PATENT DOCUMENTS

| 7,636,717 | B1 * | 12/2009 | Gupta | G06F 16/90344 |
| 10,198,671 | B1 * | 2/2019 | Yang | G06T 11/60 |
| 2014/0074852 | A1 * | 3/2014 | Sud | G06F 16/5838 707/741 |
| 2017/0323376 | A1 * | 11/2017 | Glaser | G06Q 30/0635 |
| 2017/0344808 | A1 * | 11/2017 | El-Khamy | G06T 7/70 |
| 2018/0096457 | A1 * | 4/2018 | Savvides | G06K 9/6267 |
| 2018/0189604 | A1 * | 7/2018 | Zhang | G06N 3/0454 |
| 2019/0050694 | A1 * | 2/2019 | Fukagai | G06K 9/00664 |
| 2019/0050994 | A1 * | 2/2019 | Fukagai | G06K 9/3233 |
| 2019/0130232 | A1 * | 5/2019 | Kaasila | G06N 3/0454 |
| 2019/0138850 | A1 * | 5/2019 | Sigal | G06N 3/084 |
| 2019/0228276 | A1 * | 7/2019 | Lei | G06K 9/3258 |
| 2020/0034658 | A1 * | 1/2020 | Chung | G06K 9/3216 |

OTHER PUBLICATIONS

Kovalchuk, Alon, Lior Wolf, and Nachum Dershowitz. "A simple and fast word spotting method." 2014 14th International Conference on Frontiers in Handwriting Recognition. IEEE, 2014. (Year: 2014).*

(Continued)

*Primary Examiner* — Andrae S Allison
(74) *Attorney, Agent, or Firm* — Nicholson De Vos Webster & Elliott, LLP

(57) ABSTRACT

Techniques for keypoint-based multi-label word segmentation and localization are described. A machine learning model identifies bounding regions of text within an image, and then generates multiple channel matrices representing predicted keypoints of the text within the bounding regions. The keypoints can be used to rectify the corresponding graphical content from the image including the text to improve the ability to perform optical character recognition and identify the text. Line and word segmentation and localization can be performed together.

20 Claims, 11 Drawing Sheets

(56) References Cited

OTHER PUBLICATIONS

Zhong, Zhuoyao, Lei Sun, and Qiang Huo. "An anchor-free region proposal network for Faster R-CNN-based text detection approaches." International Journal on Document Analysis and Recognition (IJDAR) 22.3 (2019): 315-327. (Year: 2019).*
Busta, Michal, Lukas Neumann, and Jiri Matas. "Deep textspotter: An end-to-end trainable scene text localization and recognition framework." Proceedings of the IEEE International Conference on Computer Vision. 2017 (Year: 2017).*
Ren, Shaoqing, et al. "Faster r-cnn: Towards real-time object detection with region proposal networks." Advances in neural information processing systems. 2015. (Year: 2015).*
Yuan, Peng, Yangxin Zhong, and Yang Yuan. "Faster r-cnn with region proposal refinement." Tech. Rep. (2017). (Year: 2017).*
Shao, Fanning, et al. "Improved faster R-CNN traffic sign detection based on a second region of interest and highly possible regions proposal network." Sensors 19.10 (2019): 2288. (Year: 2019).*
Zhong, Zhuoyao, Lei Sun, and Qiang Huo. "Improved localization accuracy by locnet for faster r-cnn based text detection." 2017 14th IAPR International Conference on Document Analysis and Recognition (ICDAR). vol. 1. IEEE, 2017. (Year: 2017).*
Hu, Ronghang, et al. "Natural language object retrieval." Proceedings of the IEEE Conference on Computer Vision and Pattern Recognition. 2016. (Year: 2016).*
Vision API, Optical character recognition (OCR), https://cloud.google.com/vision/docs/ocr Capture at Mar. 25, 2018 (Year: 2018).*
Nagaoka, Yoshito, et al. "Text detection by faster R-CNN with multiple region proposal networks." 2017 14th IAPR International Conference on Document Analysis and Recognition (ICDAR). vol. 6. IEEE, 2017. (Year: 2017).*

\* cited by examiner

REQUEST 150A

```
{
   "IMAGE": {
      "BYTES": BLOB,
      "S3OBJECT": {
         "BUCKET": "STRING",
         "NAME": "STRING",
         "VERSION": "STRING"
      },
   },
   "RETURNKEYPOINTS": BINARY
}
```

RESPONSE 152A

```
{
   "TEXTDETECTIONS": [
      {
         "CONFIDENCE": NUMBER,
         "DETECTEDTEXT": "STRING",
         "GEOMETRY": {
            "POLYGON": {
               "TOP-LEFT": NUMBER,
               "TOP-RIGHT": NUMBER,
               "BOTTOM-LEFT": NUMBER,
               "BOTTOM-RIGHT": NUMBER
            }
         },
         "ID": NUMBER,
         "PARENTID": NUMBER,
         "TYPE": "STRING"
      }
   ]
}
```

*FIG. 6*

KEYPOINT-BASED MULTI-LABEL WORD SEGMENTATION AND LOCALIZATION

BACKGROUND

Image analysis services are used to analyze an image of a scene and determine whether items of text are present in the image, and what those items of text are. However, such text in images may be rotated, inclined, and/or curved, and hence it can be difficult to accurately detect. Further, characters within a given text string may have variations in height, which may make it challenging to identify such text using computerized techniques. Accordingly, conventional image analysis systems ineffectively identify the locations and content of text within an image.

BRIEF DESCRIPTION OF DRAWINGS

Various embodiments in accordance with the present disclosure will be described with reference to the drawings, in which:

FIG. 6 is a diagram illustrating an exemplary DetectText request message including a returnkeypoints flag and a DetectText response message including multi-point polygon data according to some embodiments.

DETAILED DESCRIPTION

Figure 1:
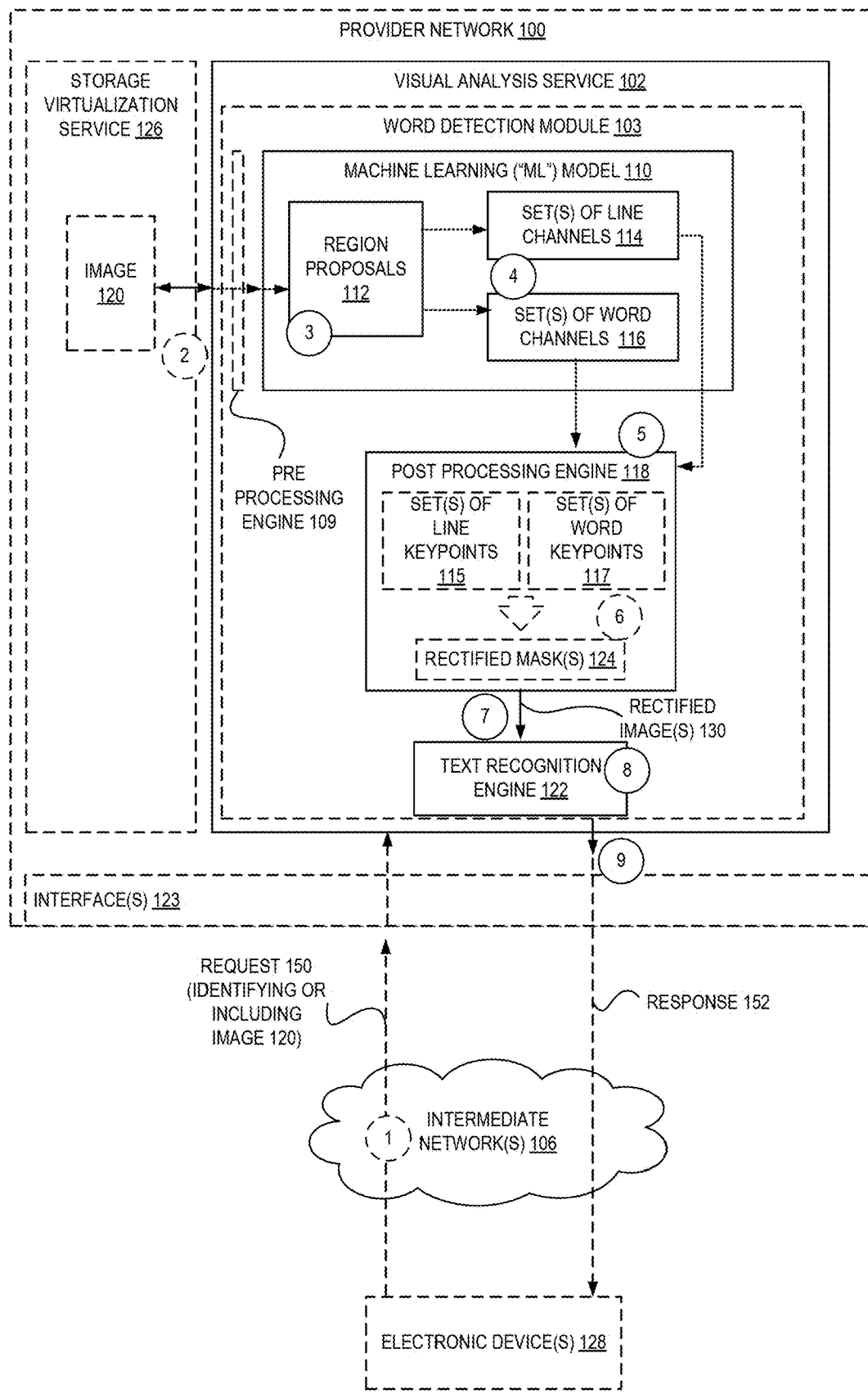
FIG. 1 is a diagram illustrating an environment for keypoint-based multi-label word segmentation and localization according to some embodiments.

Various embodiments of methods, apparatus, systems, and non-transitory computer-readable storage media for keypoint-based multi-label word segmentation and localization are described. According to some embodiments, a visual analysis service provides highly-accurate text detection and recognition by utilizing machine learning (ML) techniques for keypoint detection. In some embodiments, a ML model employs a regional proposal network to identify proposed locations of text in the form of regions (or "region proposals"), and the ML model also utilizes a deep neural network such as a convolutional neural network (CNN) to identify keypoints such as corners, midpoints, etc., corresponding to the text within the regions. By detecting keypoints of words or lines of text, the visual analysis service can determine accurate beginnings and endings of word and/or lines, detect skewed or curved text (e.g., text laid out along a curve), etc., enabling the visual analysis service to rectify word crops to improve the quality of optical character recognition. Accordingly, embodiments disclosed herein provide a substantial improvement of quality compared to existing techniques. Moreover, some embodiments can provide similarly accurate detection of highly-rotated text, as other techniques are typically limited to analyzing text with a limited rotation (e.g., less than 30 degrees from horizontal, etc.)

Embodiments disclosed herein provide a new word detection module 103 that segments an image into different collections of text. In its simplest form, a collection of text may include individual word locations, where each location is a segmentation of each instance of a word in an image. At a higher, "coarser" level, a collection of text may include the location of lines of words (each being a collection of horizontal words), where the output is a segmentation of each "line of words" in an image. These levels may extend to paragraphs, pages, blobs or groupings of text, and so forth. The word detection module 103 may operate as part of a service (e.g., a web service) or be implemented as stand-alone software, as a library, or within other software.

In some embodiments, the word detection module can jointly predict a hierarchy of text collections utilizing a single machine learning (ML) model. Embodiments achieve this functionality by using a two-stage region proposal network (RPN) with a multi-label/channel matrix output, providing a type of instance-based segmentation.

In some embodiments, the first stage of a ML model predicts a region/bounding box location of a largest type of text object (e.g., a line or word). In a second stage, the "mask" or matrix output predicts the key-points of a quadrilateral providing a more granular border of the particular text. For a collection of words, in some embodiments, four matrix channels are used, one for each key-point of a quadrilateral. For a collection of words and lines, in some embodiments, 4*2 matrix channels are used—4 key-points for words, and 4 key-points for lines. For a collection of words and lines, a post-processing step may be utilized to greedily cluster the N number of words (as each line can have a variable number of words) in the 4 key-point matrices for words.

In one implementation of the matrix outputs, these four instance masks denote the top-left, top-right, bottom-right, and bottom-left of a quadrilateral. However, these instance masks are not restricted to the corners of a quadrilateral. As one example, the mid-points between the corners can be used instead. Moreover, this formulation is not limited to only quadrilaterals (i.e., those having four points), as embodiments extend these four points to any arbitrary N point polygon (e.g., by effectively replacing "four" with N in all earlier described instances).

In some embodiments, the ML model of the image text recognition system optimizes the localization associated with an image using a loss function. One formulation of the loss function is as follows:

$$L_{all} = \alpha_1 L_{cls} + \alpha_2 L_{box} + \alpha_3 L_{matrix}$$

where $L_{cls}$ is the log loss function over two classes, $L_{box}$ is a smoothL1 loss over bounding box regions, and $L_{matrix}$ is an average binary cross-entropy loss across key-point matrices, and a, are loss weights.

Thus, embodiments provide improved quality over conventional text recognition systems, and provide substantially improved performance with highly-rotated or oddly-aligned text in nearly any orientation, whereas traditional approaches tend to be limited to identifying text that is highly horizontal (e.g., within thirty degrees of horizontal).

For further detail, FIG. 1 is a diagram illustrating an environment for keypoint-based multi-label word segmentation and localization according to some embodiments. FIG. 1 illustrates a visual analysis service 102 that can analyze image data (e.g., digital representations of images, whether from a single image or a frame of a video). The visual analysis service 102 may be an online service configured to detect objects in images, analyze text (e.g., Unicode text) in images, etc. The visual analysis service 102 may include one or more neural networks trained to detect one or more objects in images, such as but not limited to region proposal networks (RPNs), and/or classification deep neural networks, convolutional neural networks (CNNs), region-based convolutional neural networks, deep neural networks, etc., or a combination thereof.

The visual analysis service 102 may be implemented within a provider network 100. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service that can execute compute instances, a storage virtualization service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internal via one or more interface(s) 123, such as through use of application programming interface (API) calls, via a console implemented as a website or application, etc. The interface(s) 123 may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code or other tasks to be executed by the provider network, which in turn utilizes a compute instance to execute the code (typically without the user having any control of or knowledge of the underlying compute instance(s) involved).

The visual analysis service 102 can analyze an image 120 to identify text that is depicted within the image 120 and/or the locations of components of the text—e.g., lines, words, paragraphs, pages, etc.—depicted in the image 120. For example, as shown at optional circle (1), an electronic device 128 (e.g., of a user of the provider network 100 and/or visual analysis service 102) may transmit a request 150 across one or more intermediate networks 106 to the visual analysis service 102. In some embodiments, such as in some environments where the visual analysis service 102 operates as part of a provider network 100, the request 150 may be received at an interface 123 of the provider network 100, which thereafter provides the request 150 to the visual analysis service 102.

The request may identify a location of an image 120—e.g., a Uniform Resource Locator (URL) to an image 120 stored within or outside of the provider network 100. For example, the image 120 may be stored at a location (e.g., in a folder or "bucket") within a storage virtualization service 126, and the request 150 may include an identifier of the image 120 (e.g., a reference to a particular image 120 within a virtual/physical storage location of a storage virtualization service 126). In this case, at optional circle (2), the visual analysis service 102 may obtain the image 120 from the storage virtualization service 126 by sending a request for the image 120 to the storage virtualization service 126, directly accessing a storage location of the image 120, etc.

The image 120 may be outside of the provider network 100, such as being hosted by a web site, File Transfer Protocol (FTP) site, peer-to-peer system, etc., that may be accessible across one or more intermediate networks 106. As yet another example, the image 120 may belong to a "stream" of images, and thus the request 150 may identify the stream (such as when multiple images of the stream are to be analyzed) and possibly a logical condition that can be evaluated to identify particular images from the stream to be evaluated. In some embodiments the request 150 may instead include (or "carry") an input image 120, e.g., as one or more base64-encoded image bytes. In some embodiments, the request 150 is a web service call, and thus can be an HyperText Transfer Protocol (HTTP) GET or POST request message destined to an endpoint associated with the provider network 100 and/or visual analysis service 102.

It is also possible to for the processing of an image 120 to occur in different ways. For example, another service within the provider network 100 may send a request, a schedule may be configured to invoke image processing, a set of conditions may be defined that when one or more evaluates to being true will cause an image to be processed, etc.

Regardless of how the text analysis process is invoked, at circle (3) the visual analysis service 102 utilizes a machine learning (ML) model 110 as part of the processing. Optionally, in some embodiments, a set of pre-processing operations may be performed by a pre-processing engine 109. The pre-processing engine 109 may be implemented as a software component, hardware component, or a combination of both. In various embodiments, the pre-processing engine 109 may perform pre-processing operations to transform the image 120 into a format that is more easily processed by the machine learning model 110, such as resizing the image 120 to an "optimal" size, padding the re-sized image, generating multiple resolution versions of the image 120, etc.

Thus, the ML model 110 operates using the image 120 data or data resulting from pre-processing of image 120 data. The ML model 110 may include a variety of phases or stages, such as a first set of phases/stages that at circle (3) can generate region proposals 112, also referred to commonly as regions of interest (RoI) or proposals, that are predicted to include text. The ML model 110 may generate zero, one, or multiple such regions, where each region may be data identifying a rectangular area (e.g., a square, a rectangle) within the image. The ML model 110 may similarly generate, for each region, an associated confidence score indicating a confidence that the region has text within it. For example, a confidence score of 0.97 may indicate a 97% confidence that a corresponding region has text depicted within it. Text found represented within an image may be, by way of example, a license plate number from a license plate, an address on a street sign or receipt, a phone number, a zip code, a monetary value, etc.

The ML model 110 may also include a second one or more phases or stages that at circle (4) can generate sets of line channels 114 and/or sets of word channels 116 based on the region proposals 112. A channel may be, for example, a matrix of one or more values representing likelihoods that corresponding locations in the image include a particular type of feature related to text (e.g., a top-left corner of a word, a top-left corner of a line, a bottom-right corner of a word, a top-middle portion of a line, etc.) However, in other embodiments this information may be encoded/represented differently, such as through use of values corresponding to a particular coordinate (e.g., a top-left corner of a line is located at [x=50px; y=123px]) or a similar representation known by those of skill in the art.

The matrix channels 114/116 may be provided to a post-processing engine 118 at circle (5), which may be implemented as a software module, a hardware unit, or a combination of both.

The post-processing engine 118 may optionally at circle (6) identify particular keypoints 115/117 using the outputted matrix channels 114/116. For example, the values of each of the set(s) of line channels 114 can be analyzed to identify one or more points that are the most likely to correspond to that matrix channel's associated feature—e.g., what point is most likely the bottom-right location of the text within the image, etc.

In some embodiments, using these set(s) of line keypoints 115 and/or set(s) of word keypoints 117, the post-processing engine 118 may generate one or more rectified mask(s) 124, which can be used with the initial image portions to generate rectified images 130 that can improve the ability of the later-utilized text recognition engine 122 to identify the particular text in the image, and thus, improve the quality of optical character recognition. As one example, because the post-processing engine 118 can identify which keypoints correspond to particular text locations (e.g., top-left, bottom-right, etc.), the post-processing engine 118 can perform simple image manipulation operations (e.g., rotate by particular amount) to rectify the image to get provide a "better" view (e.g., approximately horizontal) of the word or line. Moreover, some embodiments can detect text that is not represented in the image in the "traditional" manner (e.g., left to right, and horizontal for English)—e.g., a bottom-left channel may identify a bottom-left keypoint that is actually represented on the bottom-right portion of the bounding box region due to the text being represented in a vertical manner, such as being rotated ninety degrees. With this information, the post-processing engine 118 can rectify the image(s)—e.g., by rotating it—to orient the text in the more traditional manner expected by the text recognition engine 122, which is not able to be done using traditional bounding box based approaches, as such approaches do not have visibility into the layout/orientation of the text within the bounding box. As another example, the post-processing engine 118 may identify that text is laid out in an arc (e.g., a rainbow-type shape) based on the keypoints, and may create a rectified image by rearranging the individual words onto an approximately horizontal line.

As another example, in some embodiments the post-processing engine 118 expands the size of the keypoint region so that one or more points lie in the border of the bounding box/region. As keypoint prediction may not be perfect—e.g., a detected top-left corner might be too much toward the center of the image and thus, part of the text might be inadvertently removed—and thus, embodiments may expand one or more (or all) of the keypoints of the polygon to fill the outer bounding box.

Thus, rectified image(s) 130 of the text can be provided to the text recognition engine 122 at circle (8). For example, in some embodiments, the text recognition engine 122 operates on rectified images representing lines of text and not individual words (or, possibly on individual words only when the text recognition engine 122 is unable to identify a particular word within a line). However, in many cases due to the rectification of the lines due to the line channel orientation information generated as described above, the text recognition engine 122 can identify all or most words within a line with extremely high accuracy due to it examining image data that is highly like the data it was trained upon. The text recognition engine 122 may be implemented using software, hardware, or a combination of both. In some embodiments, the text recognition engine 122 can be a general optical character recognition engine known to those of skill in the art.

At circle (9), the text recognition engine 122 may output the identified words and/or lines of text. This data may be used in a variety of ways, such as by storing it at some storage location (e.g., within a storage virtualization service 126) for later access by a user or program, sending it back to a requesting user via a response message 152, provided to another system or machine learning model for some practical use (e.g., route planning for a self-operating vehicle, generating an audio output of the text), etc.

Figure 2:
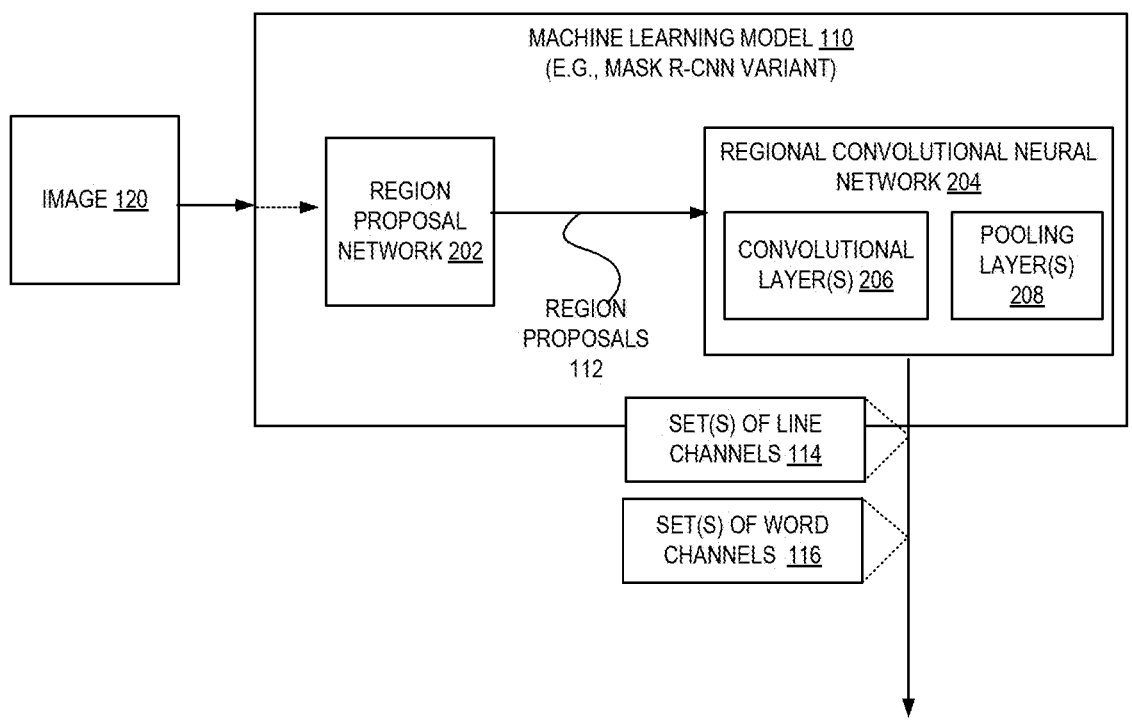
FIG. 2 is a diagram illustrating aspects of a machine learning model utilized in some environments for keypoint-based multi-label word segmentation and localization according to some embodiments.

For additional detail involving one formulation of the ML model 110, we turn to FIG. 2, which is a diagram illustrating aspects of a machine learning model utilized in some environments for keypoint-based multi-label word segmentation and localization according to some embodiments. In some embodiments, the ML model 110 is a modified formulation of a Mask R-CNN model.

As is known to those of skill in the art, a popular ML model (or "framework") is the Faster R-CNN detector, which utilizes two stages. The first stage, called a Region Proposal Network (RPN), proposes candidate object bounding boxes. The second stage, which is essentially the known Fast R-CNN model, extracts features using RoIPool from each candidate box and performs classification and bounding-box regression. The features used by both stages can be shared for faster inference. Mask R-CNN, however, adopts the same two-stage procedure as in Faster R-CNN, having an identical first stage (RPN), but in the second stage, in parallel to predicting the class and box offset, Mask R-CNN also outputs a binary mask for each RoI.

However, embodiments disclosed herein use a different formulation compared to previous approaches for text recognition and/or uses of Mask R-CNN. In some embodiments, the ML model can include a backbone network, a RPN 202 generating region proposals 112 (and optionally losses for segmentation/classification), and a regional convolutional neural network 204, including one or more convolutional layers 206 and one or more pooling layers 208, that extracts features to generate output (channels 114/116) that predicts (or can be used to predict) the keypoints of each word and/or line in the image. The convolutional layers 206 and/or pooling layers 208 can be specially augmented to extract this type of feature. Additionally or alternatively, the RPN 202 can be trained using longer than typical default box sizes to the natural elongation of text strings (e.g., the default bounding boxes and/or aspect ratios used by the RPN can be changed to ones more commonly useful for text—e.g., having "longer" or "taller" boxes).

Notably, the output of the ML model 110 is not what is traditionally generated for this use case, as traditionally most approaches are not trying to predict orientation of an object with that previous formulation of Mask R-CNN. In the output matrix, the ML model 110 (or network) will predict a point, rather than directly doing regression on the point like other formulations. So, this approach can be flexibly extended to work on curved text, oriented text, lines of text, and so forth.

Figure 3:
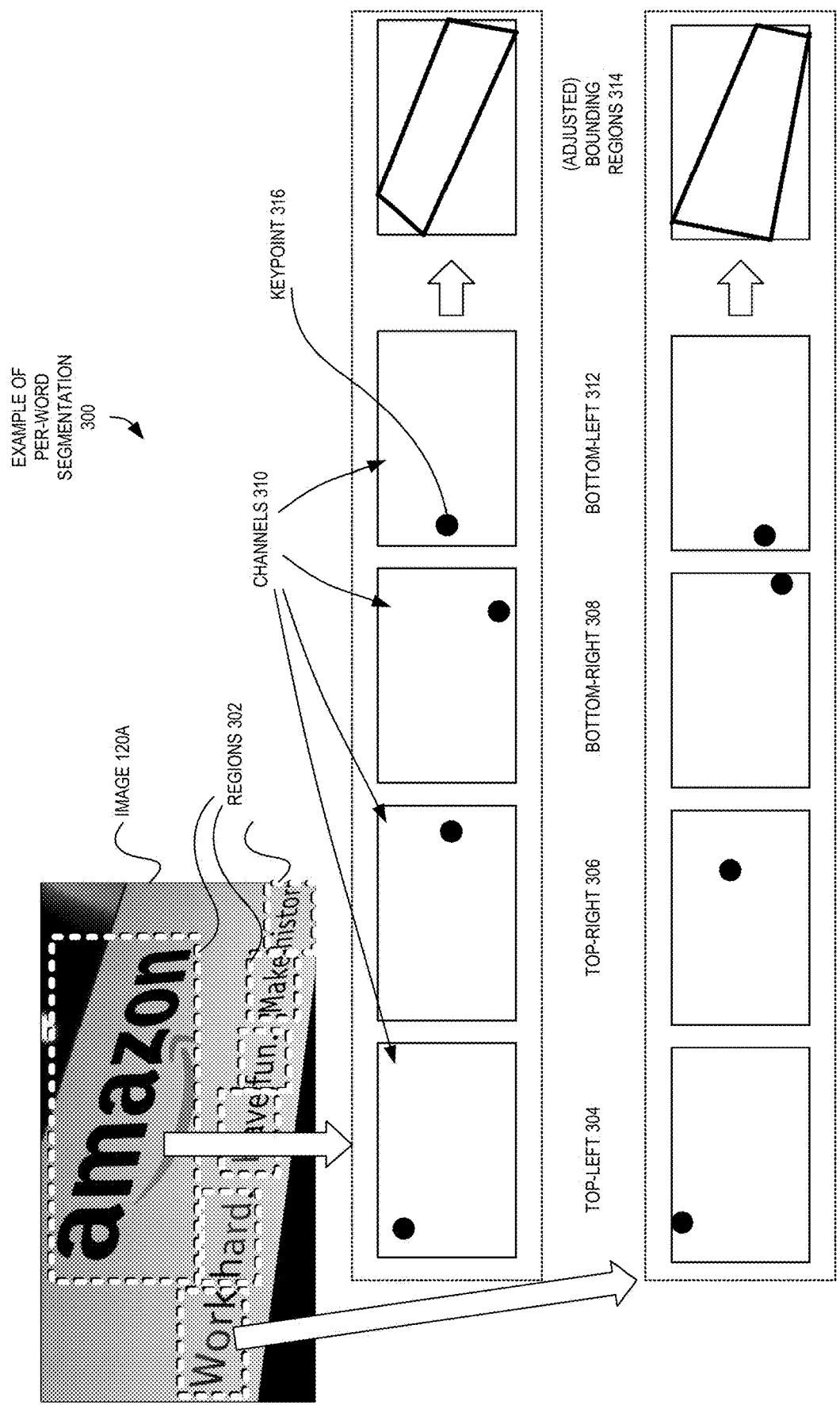
FIG. 3 is a diagram illustrating a visualization of per-word segmentation according to some embodiments.

FIG. 3 is a diagram illustrating a visualization of an example 300 of per-word segmentation according to some embodiments. For the purpose of this example, the example input image 120A includes a word "amazon" at the top, and below that a line including the phrase "Word hard. Have fun. Make history." at the bottom. Due to the perspective of the picture-taker, all of the text is oriented on a slight declined angle (with regard to horizontal). In this example, we consider a scenario in which only per-word segmentation is performed.

In this case, a portion of the ML model 110 (e.g., the region proposal network 202) identifies a number of regions 302 that each likely include a word. These regions are predicted using bounding boxes (or access aligned bounding boxes), each of which is shown with dashed lines in this figure. Notably, in some embodiments, all of these regions 302 can be identified and processed at substantially the same time.

Further processing of two of the regions 302 is represented here. For the word "amazon", four different representations of the channels 310 (or channel matrices) are shown in a first row that correspond to the top-left 304 of the word, the top-right 306 of the word, the bottom-right 308 of the word, and the bottom-left 312 of the word. Each of the channels 310 is shown with a keypoint 316 corresponding to the predicted location of the corresponding keypoint within the image 120A, and could be a single activated pixel/matrix value corresponding to a location of a predicted keypoint. These four keypoints 316 can be combined into a bounding region 314 (e.g., during post-processing), which in this case is an "adjusted" bounding region in that one or more of the keypoints (here, all of the four keypoints) is moved to lie on the border of the bounding box. With this bounding region 314, a mask can be generated or modified to allow for the word to be "pulled" from the original image 120A on its own. Moreover, in some embodiments, with the knowledge of the layout/orientation of the image (as reflected by the bounding region 314), the masked image can be further adjusted (e.g., rotated, stretched, etc.) to re-align the text to be of a more typical orientation—e.g., horizontal.

Another example is shown for the first word in the bottom line of the image 102A—"Work." In this case, slightly different keypoints 316 are shown to reflect the different intra-region locations of the text, yielding a slightly different (adjusted) bounding region 314. Accordingly, the word "amazon" is detected to have a different bounding region angle compared to that of the word "Work", allowing for each word to be independently rectified in a best way for each word, increasing the overall accuracy of the system.

Figure 4:
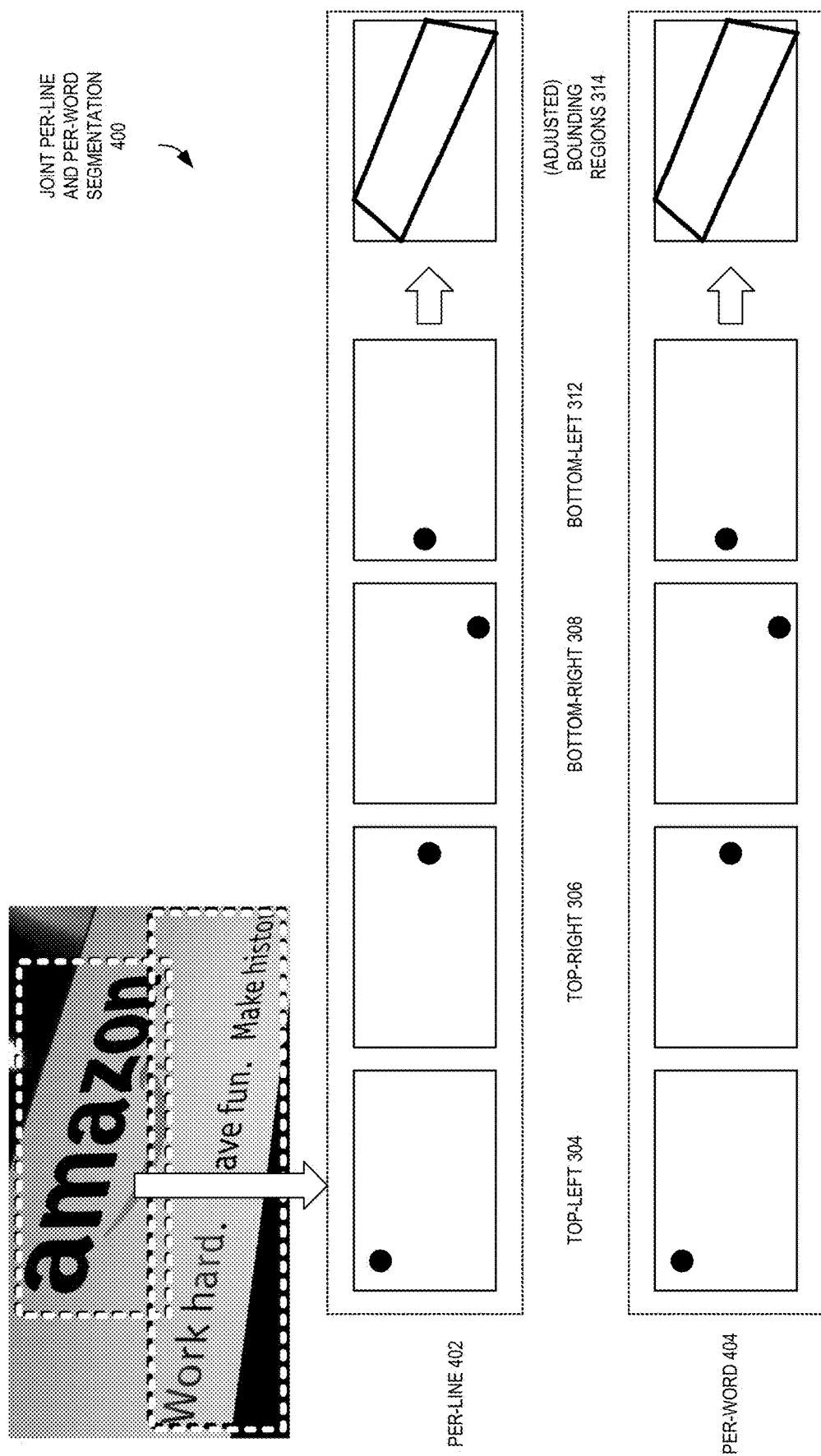
FIG. 4 is a diagram illustrating a visualization of joint per-line and per-word segmentation for a first line of an image according to some embodiments.
Figure 5:
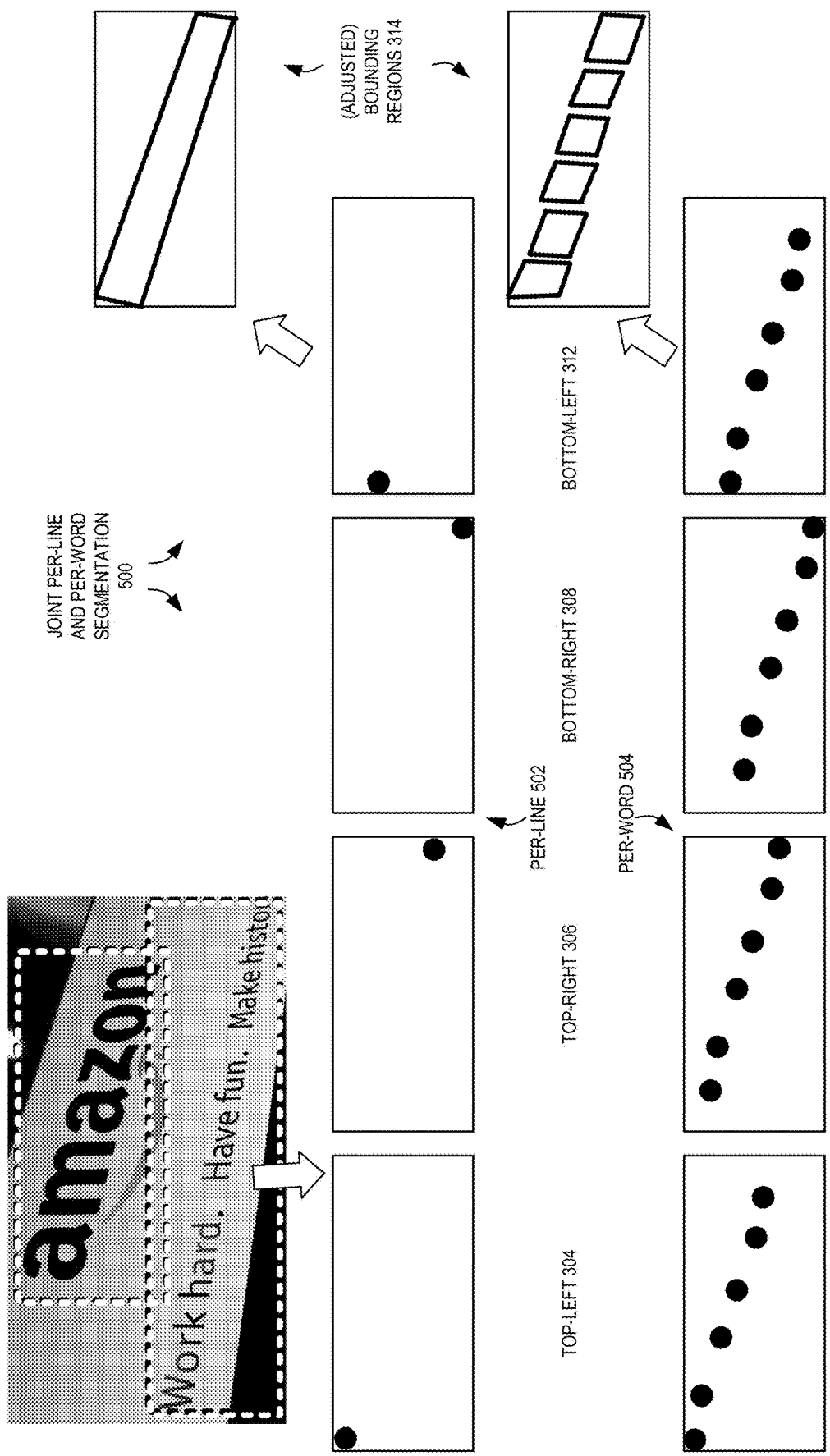
FIG. 5 is a diagram illustrating a visualization of joint per-line and per-word segmentation for a second line of an image according to some embodiments.

Similarly, FIG. 4 is a diagram illustrating a visualization of joint per-line and per-word segmentation for a first line (or, "amazon") of the image 102A according to some embodiments, and FIG. 5 is a diagram illustrating a visualization of joint per-line and per-word segmentation for a second line (or, "Work hard. Have fun. Make history.") of the image according to some embodiments. In FIG. 4, only the line including "amazon" is analyzed, though more channels are generated to attempt to identify different "levels" of text. Here, a first row of channels is shown for a per-line analysis 402, in which the keypoints for the entire line are identified, leading to an (adjusted) bounding box. Also, the second row is shown as performing per-word analysis 404 within the word "amazon"—in this case, the same channels are generated due to the line and word being the same. Notably, these per-line 402 and per-word 404 channels can be generated at substantially the same time.

In contrast, in FIG. 5, the second line of "Work hard. Have fun. Make history." is analyzed with the same eight channels—four for per-line analysis 502, and four for per-word analysis 504. In this case, the per-line 502 channels show the top-left, top-right, bottom-right, and bottom-left predicted keypoints for the entire line, resulting in an adjusted bounding region for the entire line. In some embodiments, this adjusted bounding region can be used to yield a mask and resultant rectified masked image, which can be analyzed using an optical character recognition engine to yield all of the words in the line, potentially avoiding the need to perform optical character recognition on the individual words.

Additionally, the last four channels for the per-word analysis 405 show that are six different predicted top-left 304 locations, six different predicted top-right 306 locations, six different predicted bottom-right 308 locations, and six different predicted bottom-left 312 locations, which results in six different adjusted bounding regions corresponding to the six words of the line. In some embodiments, the post-processing can include performing a proximity analysis to determine whether any ones of the points are actually referring to a same location, etc.

In various embodiments, multiple methods could be used to combine keypoints of each of the per-word channels to identify individual words. For example, as the system may already know the overall orientation of the text (from the per-line analysis), embodiments can greedily match the very top left point to the top left point of the other channels, and then removing each of these points from the pool of points. This process can be repeated until all points are accounted for, yielding a collection of words in the line.

To identify the multiple points within a channel (e.g., from values of a channel matrix), embodiments could identify certain border values from the matrices, though other embodiments include performing some thresholding to determine the hotspots to get the multiple points, e.g., by choosing the highest-scoring local maximas on the matrix as the predicted keypoints.

Accordingly, embodiments can predict both words and lines in a single formulation.

One example formulation of a request 150 and response 152 is now presented in FIG. 6, which illustrates an exemplary DetectText request message 150A including a return-keypoints flag and a DetectText response message 152A including multi-point polygon data according to some embodiments.

The request 150A may be sent as part of a web service request message (e.g., an HTTP GET or POST message sent to an endpoint of a service provider network), and may be referred to as a "DetectText" API request. This message indicates a request to detect text in an input image and convert it into machine-readable text. The image may be passed within the message (e.g., as base64-encoded image bytes) or as a reference to an image (e.g., a URL, such as a URL to a storage virtualization service location). The image may be in any number of formats, e.g., as a png, jpeg, gif, etc., formatted file.

The DetectText operation returns text in an array of TextDetection elements within a "TextDetections" element of a response 152A message. Each TextDetection element provides information about a single word or line of text that was detected in the image. A word can be one or more ISO basic latin script characters that are not separated by spaces, though embodiments can be implemented in other formats and/or with different character sets, languages, etc. A line is a string of approximately equally spaced words, and does not necessarily need to be a complete sentence. For example, a driver's license number may be detected as a line. A line may end when there is no aligned text after it. Also, a line may end when there is a large gap between words, relative to the length of the words. This means, depending on the gap between words, embodiments may detect multiple lines in text aligned in the same direction. Periods may not necessarily represent the end of a line. If a sentence spans multiple lines, the DetectText operation returns multiple lines.

To indicate whether a TextDetection element is a line of text or a word, the TextDetection includes an object Type field.

The request accepts the following data, which may be in a JavaScript Object Notation (JSON) format. An "Image" element may provide base64-encoded bytes, or a file location object (here, referenced as "S3OBJECT").

In some embodiments, the request 150A may include a field—here, "returnkeypoints" as shown in bold—indicating what outputs the user desires. For example, this flag "returnkeypoints" may indicate a request for the service to provide back a set of keypoints—i.e., the four or more keypoints described above. Other types of fields could similarly be used, e.g., to indicate the type of keypoints to be returned (e.g., top-right, top-left, bottom-right, and bottom-left vs. top-middle, bottom-middle, right-middle, left-middle), a number of keypoints to be returned (e.g., four, six, eight, sixteen, fifty) for each word, etc.

The response 152A may be sent back, e.g., in JSON format, by the service after the text detection is performed. The response 152A could include one or more TextDetection objects, each corresponding to information about a word or line of text detected. The DetectedText field contains some text (e.g., word, line) that was detected in the image.

Every word and line may have an identifier ("Id"). Each word belongs to a line and has a parent identifier ("ParentId") that identifies the line of text in which the word appears. The word Id is also an index for the word within a line of words.

The "Confidence" field provides the accuracy of the detected text and the accuracy of the geometry points around the detected text, which can be represented in a variety of ways, such as a numeric value between zero and one-hundred.

The "Geometry" field may include location/orientation information of the detected text on the image. As shown in bold, a special "polygon" object can be returned with a variety of keypoints found as described above, which may be selected based on the keypoints asked for in the corresponding request 150A.

In this example, top-left, top-right, bottom-left, and bottom-right keypoints are provided; however, it is to be understood that different types of keypoints (e.g., top-middle, etc) could be returned, different numbers (e.g., six, sixteen, etc.) of keypoints could be returned, etc.

The "Id" field provides the identifier for the detected text, the "ParentId" provides the Parent identifier for the detected text identified by the value of ID. If the type of detected text is LINE, the value of ParentId may be Null. The "Type" field provides the "type" of text that was detected, e.g., LINE or WORD.

Figure 7:
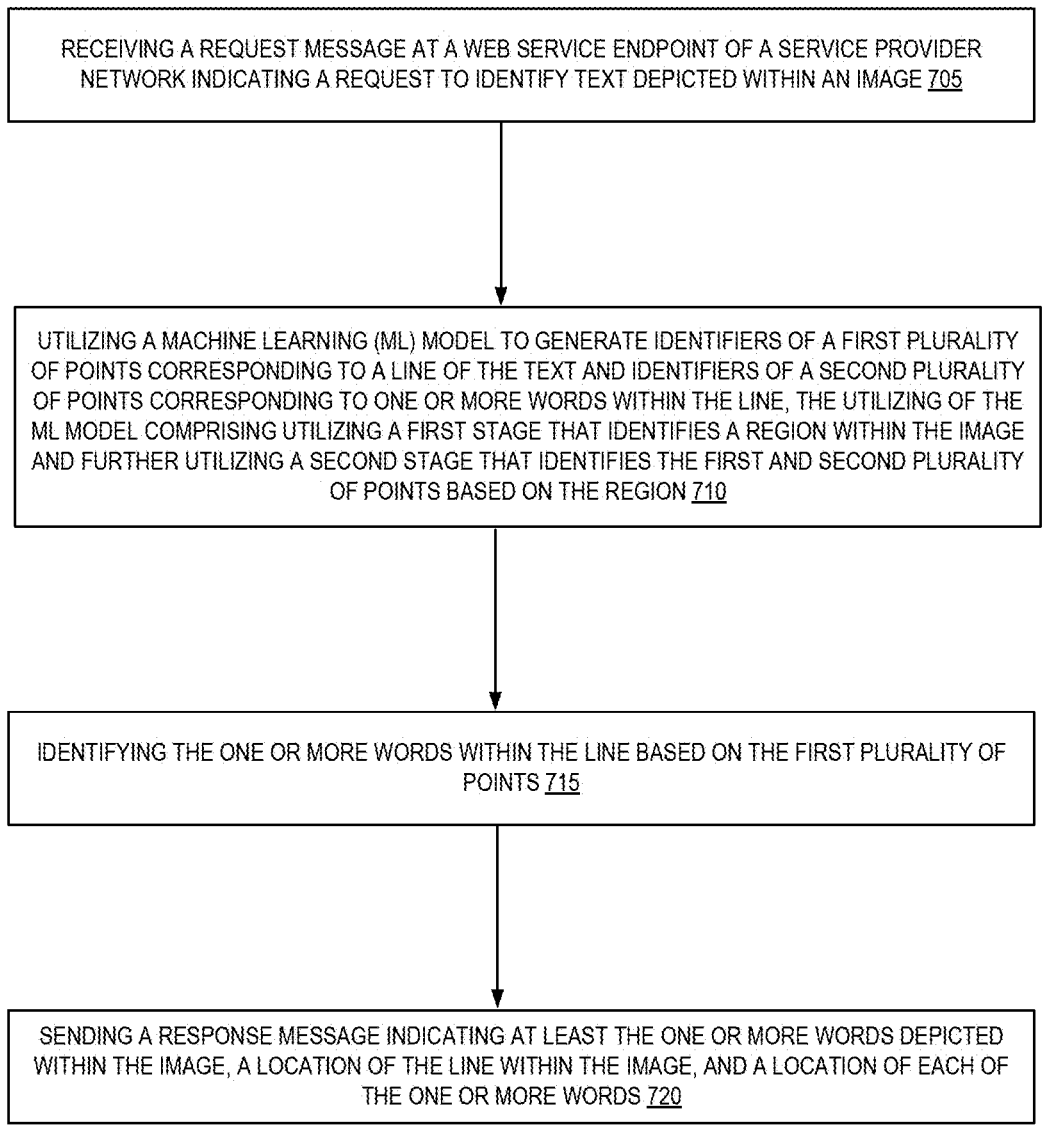
FIG. 7 is a flow diagram illustrating operations of a method for keypoint-based multi-label word segmentation and localization according to some embodiments.

FIG. 7 is a flow diagram illustrating operations 700 of a method for keypoint-based multi-label word segmentation and localization according to some embodiments.

Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by visual analysis service 102 or word detection module 103 of the other figures.

The operations 700 include, at block 705, receiving a request message at a web service endpoint of a service provider network indicating a request to identify text depicted within an image. The request message may indicate that keypoint orientation is to be returned, a type of keypoints to be returned, a number of keypoints to be returned, etc.

The operations 700 include, at block 710, utilizing a machine learning (ML) model to generate identifiers of a first plurality of points corresponding to a line of the text and identifiers of a second plurality of points corresponding to one or more words within the line, the utilizing of the ML model comprising utilizing a first stage that identifies a region within the image and further utilizing a second stage that identifies the first and second plurality of points based on the region. The ML model may include a region proposal network (RPN) and a region-based convolutional neural network (R-CNN).

The operations 700 include, at block 715, identifying the one or more words within the line based on the first plurality of points. Block 715 may include performing processing on the first plurality of points, which may include realigning one or more of the keypoints to lie on a border of a bounding box, realigning the bounding box to make the text be oriented in a horizontal manner, etc. Block 715 may also include using the keypoints to create a mask to apply to the image to yield a rectified image. The rectified image may be sent to an optical character recognition engine to analyze and identify the text represented in that portion of the image.

At block 720, the operations 700 further include sending a response message indicating at least the one or more words depicted within the image, a location of the line within the image, and a location of each of the one or more words. The location of the line within the image may comprise four or more points/keypoints indicating an outline of the corresponding line. The location of each word may comprise four or more points/keypoints indicating an outline of the corresponding word.

Figure 8:
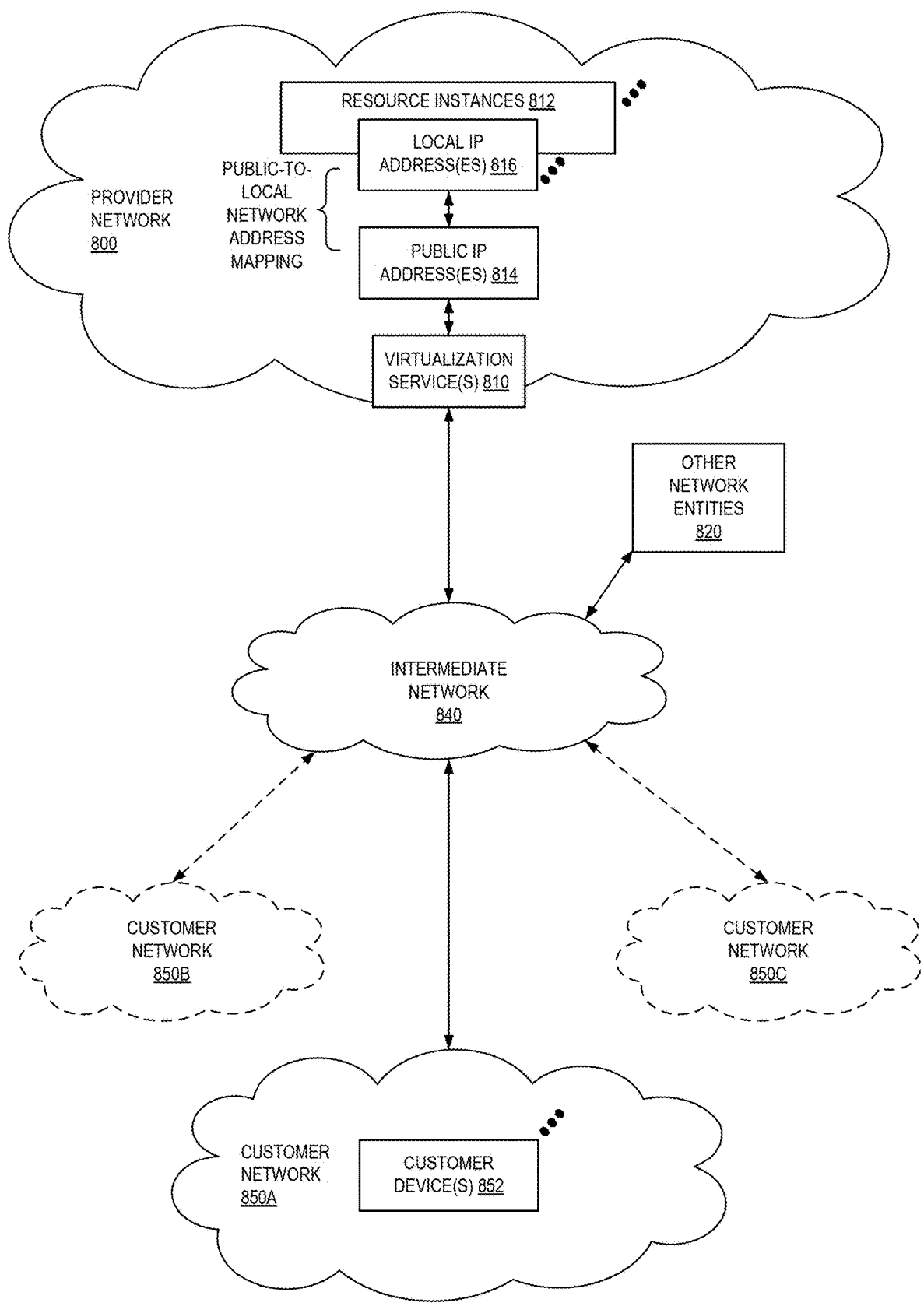
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
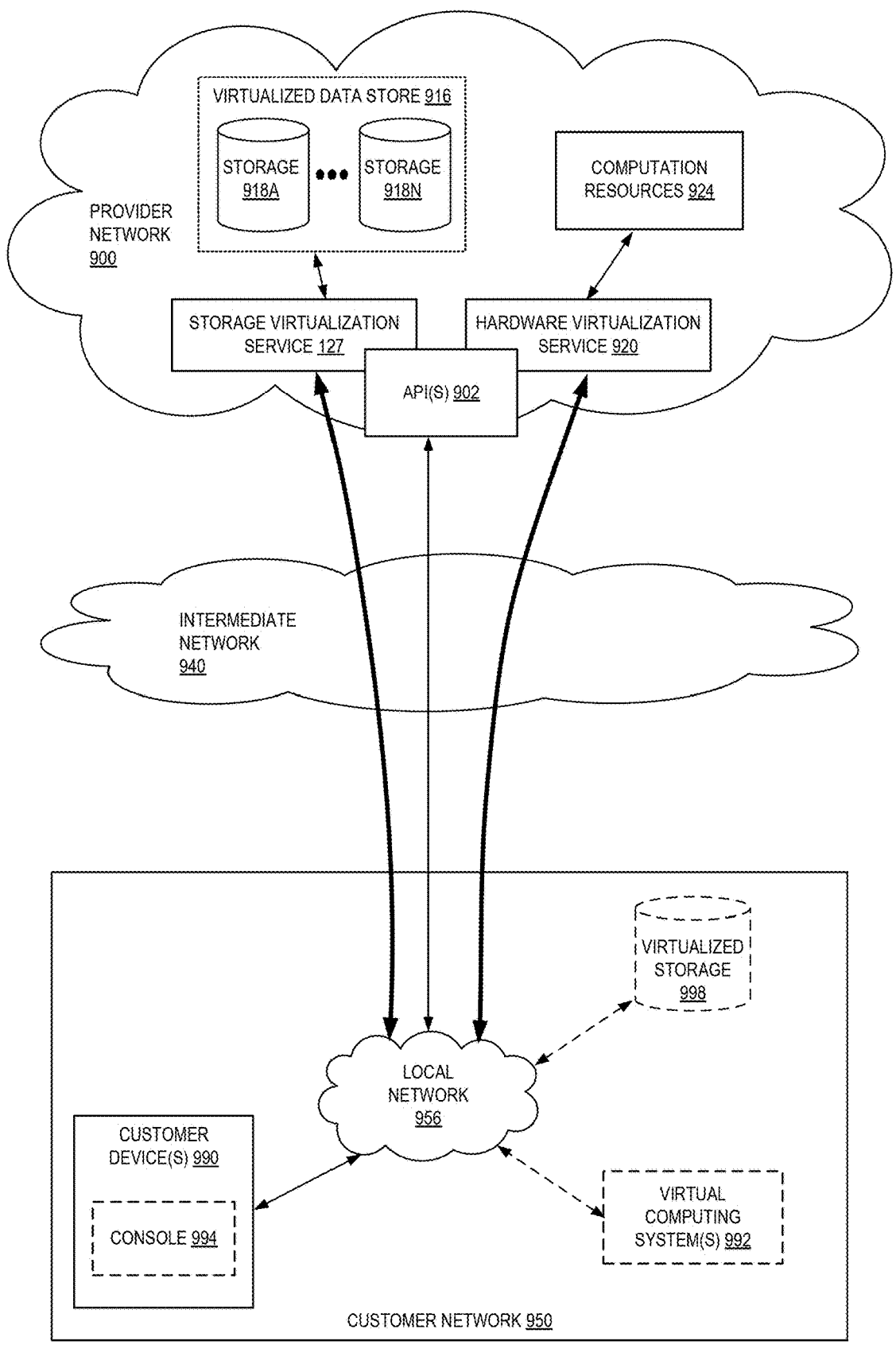
FIG. 9 is a block diagram of an example provider network that provides a storage virtualization service and a hardware virtualization service to customers according to some embodiments.

FIG. 9 is a block diagram of an example provider network that provides a storage virtualization service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage virtualization service 127, for example via one or more APIs 902, to access data from and store data to storage resources 918A-918N of a virtual data store 916 provided by the provider network 900. In some embodiments, a virtualized data store gateway (not shown) may be provided at the customer network 950 that may locally cache at least some data, for example frequently accessed or critical data, and that may communicate with virtualized data store service 127 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes, which appear to the user as local virtualized storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative System

Figure 10:
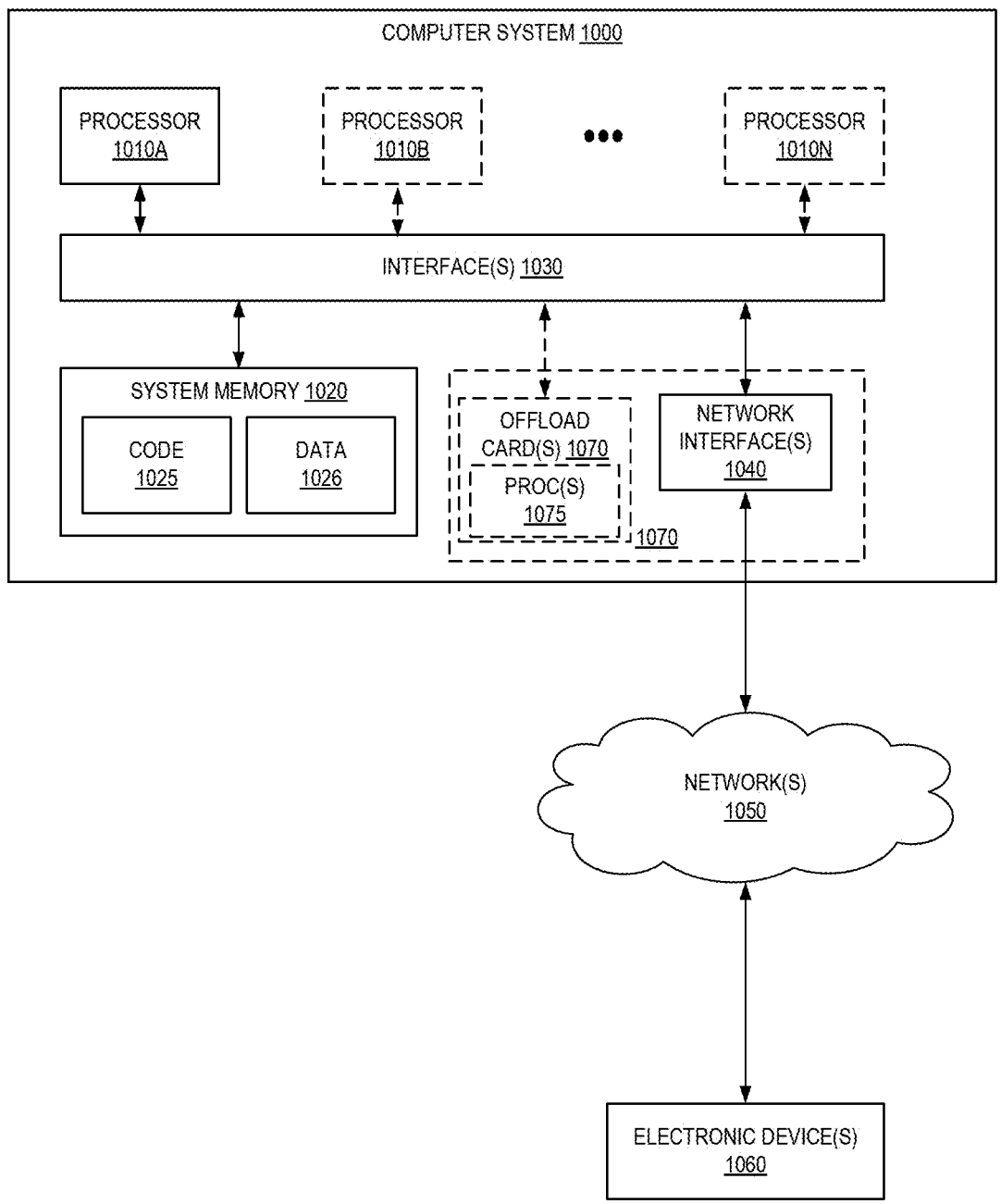
FIG. 10 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Figure 11:
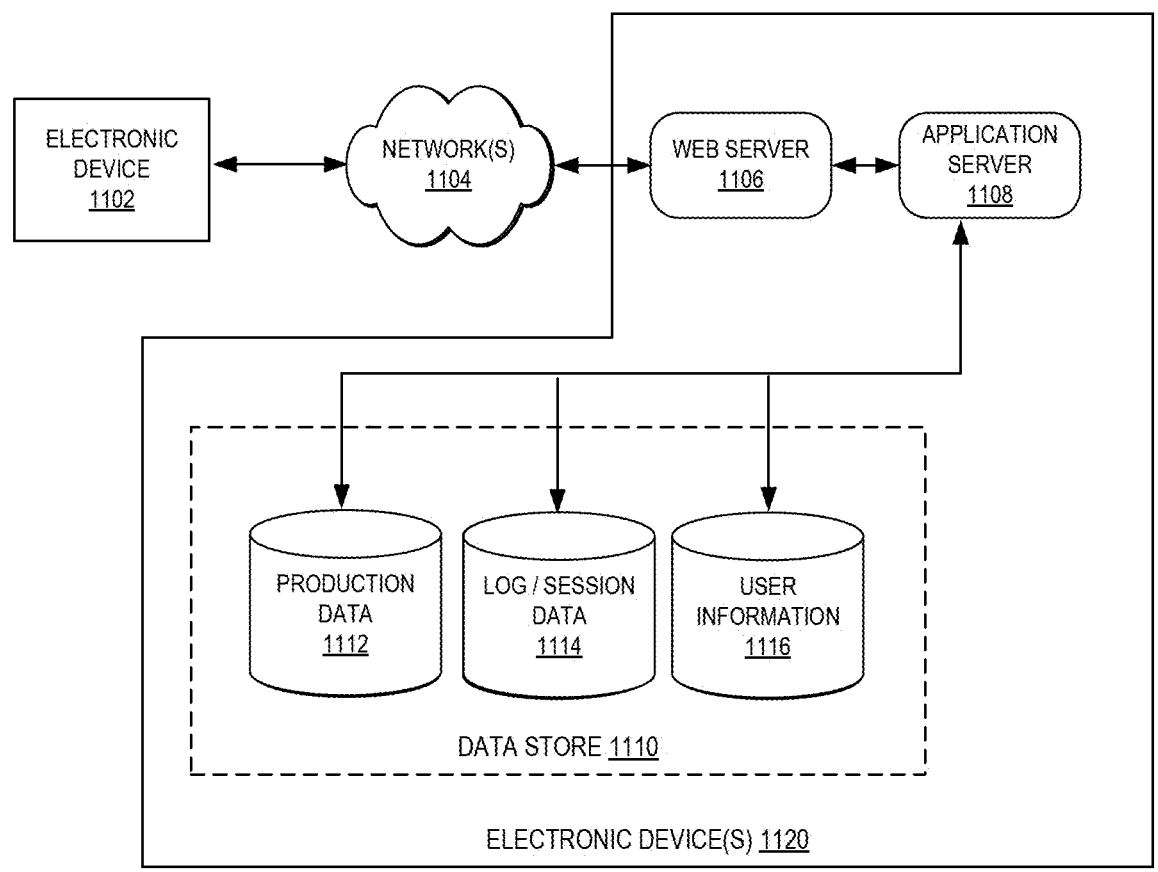
FIG. 11 illustrates an example of an environment for implementing aspects in accordance with various embodiments.

As discussed, different approaches can be implemented in various environments in accordance with the described embodiments. For example, FIG. 11 illustrates an example of an environment 1100 for implementing aspects in accordance with various embodiments. For example, in some embodiments, the DetectText request messages are HyperText Transfer Protocol (HTTP) requests that are received by a web server (e.g., web server 1106), and the users, via electronic devices, may interact with the provider network via a web portal provided via the web server 1106 and application server 1108. As will be appreciated, although a web-based environment is used for purposes of explanation, different environments may be used, as appropriate, to implement various embodiments. The system includes an electronic client device 1102, which may also be referred to as a client device and can be any appropriate device operable to send and receive requests, messages or information over an appropriate network 1104 and convey information back to a user of the device 1102. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1104 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1104 includes the Internet, as the environment includes a web server 1106 for receiving requests and serving content in response thereto, although for other networks an alternative device serving a similar purpose could be used, as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device 1102 and handling a majority of the data access and business logic for an application. The application server 1108 provides access control services in cooperation with the data store 1110 and is able to generate content such as text, graphics, audio, video, etc., to be transferred to the client device 1102, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1102 and the application server 1108, can be handled by the web server 1106. It should be understood that the web server 1106 and application server 1108 are not required and are merely example components, as structured code discussed herein can be executed on any appropriate device or host machine as discussed elsewhere herein.

The data store 1110 can include several separate data tables, databases, or other data storage mechanisms and media for storing data relating to a particular aspect. For example, the data store illustrated includes mechanisms for storing production data 1112 and user information 1116, which can be used to serve content for the production side. The data store 1110 also is shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. In one example, a user might submit a search request for a certain type of item. In this case, the data store 1110 might access the user information 1116 to verify the identity of the user and can access a production data 1112 to obtain information about items of that type. The information can then be returned to the user, such as in a listing of results on a web page that the user is able to view via a browser on the user device 1102. Information for a particular item of interest can be viewed in a dedicated page or window of the browser.

The web server 1106, application server 1108, and/or data store 1110 may be implemented by one or more electronic devices 1120, which can also be referred to as electronic server devices or server end stations, and may or may not be located in different geographic locations. Each of the one or more electronic devices 1120 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a request message at a web service endpoint of a service provider network indicating a request to identify text depicted within an image;
utilizing a machine learning (ML) model to generate identifiers of a first plurality of points corresponding to a line of the text and identifiers of a second plurality of points corresponding to one or more words within the line, the utilizing of the ML model comprising utilizing a first stage that identifies a region within the image and further utilizing a second stage that identifies the first and second plurality of points based on the region, wherein the first stage comprises at least a region proposal network (RPN) and wherein the second stage comprises a region-based convolutional neural network (R-CNN);
identifying the one or more words within the line based on the first plurality of points comprising:
adjusting at least one of the identifiers of the first plurality of points to cause the at least one of the first plurality of points to be located on a border of the region to yield a second plurality of points, and
generating an image mask or another image based on the second plurality of points; and
sending a response message indicating at least the one or more words depicted within the image, a location of the line within the image, and a location of each of the one or more words.

2. The computer-implemented method of claim 1, further comprising:
receiving, at a service provider network, a request message indicating a request to identify text within the image, the request message including data of the image or an indicator of a location of the image; and
sending a response message identifying the one or more words and one or more locations, each of the one or more locations including at least one of:
a location of a line of text within the image including the one or more words, or
a location of each word of the one or more words.

3. The computer-implemented method of claim 2, wherein the response message includes the identifiers of the plurality of points.

4. The computer-implemented method of claim 3, wherein the data of the image comprises base64-encoded image bytes or the indicator of the location of the image comprises an identifier of a bucket or folder within a storage virtualization service of the service provider network.

5. A computer-implemented method comprising:
generating, by a machine learning (ML) model, data corresponding to a region that encapsulates at least one word depicted within an image, wherein the ML model comprises at least a region proposal network (RPN) and a region-based convolutional neural network (R-CNN);
generating, via use of the ML model utilizing the data corresponding to the region, identifiers of a plurality of points associated with the at least one word; and
identifying the at least one word based on the identifiers of the plurality of points comprising:
adjusting at least one of the identifiers of the plurality of points to cause the at least one of the plurality of points to be located on a border of the region to yield a second plurality of points, and
generating an image mask or another image based on the second plurality of points.

6. The computer-implemented method of claim 5, wherein the R-CNN generates a plurality of channel matrices associated with the at least one word, and wherein the method further comprises identifying the plurality of points based on the plurality of channel matrices.

7. The computer-implemented method of claim 6, wherein the plurality of points includes at least four points.

8. The computer-implemented method of claim 7, wherein the plurality of points includes at least five points.

9. The computer-implemented method of claim 5, wherein identifying the at least one word further comprises:
causing an optical character recognition engine to perform an analysis using at least one of the image mask or the another image.

10. The computer-implemented method of claim 5, wherein:
the region encapsulates a line of text comprising a plurality of words;
the plurality of points corresponds to the line of text;
the ML model further generates, for each of the plurality of words, another plurality of points associated with that word; and
the method further comprises sending a message identifying at least the plurality of words, a location of the line within the image, and a location of each of the plurality of words.

11. The computer-implemented method of claim 5, further comprising:
receiving, at a web service endpoint of a service provider network, a request message indicating a request to identify text within the image, the request message including data of the image or an indicator of a location of the image; and
sending a response message identifying the at least one word and at least one location, the at least one location including at least one of:
a location of a line of text within the image including the at least one word, or a location of each word of the at least one word.

12. The computer-implemented method of claim 11, wherein the at least one location comprises the identifiers of the plurality of points or another set of identifiers based on the identifiers of the plurality of points.

13. The computer-implemented method of claim 12, wherein the request message further includes a field indicating that the identifiers of the plurality of points or another set of identifiers are to be returned in the response message.

14. The computer-implemented method of claim 5, wherein the ML model generates a plurality of matrices, each of the plurality of matrices including a plurality of point values, and wherein each of the identifiers of the plurality of points are determined based on one or more of the point values of a corresponding matrix of the plurality of matrices.

15. The computer-implemented method of claim 14, further comprising training the ML model using a loss function that is at least partially based on an average binary cross-entropy loss across ones of the plurality of matrices.

16. A system comprising:
a web service endpoint implemented by a first one or more electronic devices, the web service endpoint including instructions that upon execution cause the web service endpoint to:
receive a request message indicating a request to identify text within an image, and
send the request message to a visual analysis service;
the visual analysis service, implemented by a second one or more electronic devices, the visual analysis service including instructions that upon execution cause the visual analysis service to:
generate, by use of a machine learning (ML) model, data corresponding to a region that encapsulates at least one word depicted within the image wherein the ML model comprises at least a region proposal network (RPN) and a region-based convolutional neural network (R-CNN);
generate, via use of the ML model utilizing the data corresponding to the region, identifiers of a plurality of points associated with the at least one word; and
identify the at least one word based on the identifiers of the plurality of points, the identification comprising:
an adjustment of at least one of the identifiers of the plurality of points to cause the at least one of the plurality of points to be located on a border of the region to yield a second plurality of points, and
a generation of an image mask or another image based on the second plurality of points.

17. The system of claim 16, wherein the RPN generates the data corresponding to the region, and the R-CNN generates a plurality of matrices, wherein the identifiers of the plurality of points are generated based on the plurality of matrices.

18. The system of claim 16, further including instructions that upon execution cause the visual analysis service to:
receive, at a service provider network, a request message indicating a request to identify text within the image, the request message including data of the image or an indicator of a location of the image; and
send a response message identifying the at least one word and at least one location, the at least one location including at least one of:
a location of a line of text within the image including the at least one word, or a location of each word of the at least one word.

19. The system of claim 18, wherein the response message includes the identifiers of the plurality of points.

20. The system of claim 19, wherein the data of the image comprises base64-encoded image bytes or the indicator of the location of the image comprises an identifier of a bucket or folder within a storage virtualization service of the service provider network.

* * * * *